(12) United States Patent
Berry et al.

(10) Patent No.: US 8,170,973 B2
(45) Date of Patent: May 1, 2012

(54) SATISFYING RULES THROUGH A CONFIGURATION OF LIST PROCESSING METHODS

(75) Inventors: Charles Franklin Berry, Apalachin, NY (US); Glenn C. Godoy, Endwell, NY (US); Amy Jeanne Snavely, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 975 days.

(21) Appl. No.: 12/164,214

(22) Filed: Jun. 30, 2008

(65) Prior Publication Data

US 2009/0327093 A1 Dec. 31, 2009

(51) Int. Cl.
G06E 1/00 (2006.01)
G06F 3/00 (2006.01)
(52) U.S. Cl. .............................. 706/47; 726/23; 382/203
(58) Field of Classification Search ...................... 706/47
See application file for complete search history.

(56) References Cited

U.S. PATENT DOCUMENTS

| 7,197,480 | B1 | 3/2007 | Chollon et al. |
| 7,356,496 | B2 | 4/2008 | Kane et al. |
| 7,386,495 | B2 | 6/2008 | Cirulli et al. |
| 2006/0143144 | A1 * | 6/2006 | Speeter et al. ................... 706/47 |
| 2007/0192218 | A1 | 8/2007 | Licardi et al. |
| 2008/0077418 | A1 | 3/2008 | Coleman et al. |
| 2008/0077860 | A1 | 3/2008 | Godoy et al. |
| 2008/0235731 | A1 * | 9/2008 | Bryant et al. ................... 725/44 |

* cited by examiner

*Primary Examiner* — Omar Fernandez Rivas
*Assistant Examiner* — Kalpana Bharadwaj
(74) *Attorney, Agent, or Firm* — Schmeiser, Olsen & Watts; John R. Pivnichny (57) ABSTRACT

A method and system for satisfying rules through a configuration of list processing methods. A document received from a calling application includes items being processed. A procedure for satisfying rules is identified by matching, via a database, a combination of values to the procedure. The combination of values includes attributes of the calling application and the document. Steps included in the procedure are determined by matching, via the database, the procedure to the steps. The order for executing the steps is determined by identifying, via the database, predecessor and successor steps. Sets of one or more list processing methods are determined and associated with each step. The order for executing each set of list processing methods is determined. The steps are executed. A selection list of elements is displayed to facilitate a selection of an element to characterize an item included in the document.

20 Claims, 9 Drawing Sheets

| PROCEDURE ID | CORPORATION ID | BUSINESS FUNCTION CODE | PROCEDURE NAME | ... |
|---|---|---|---|---|
| PRCHTYPE_PR_NA | IBM | DET_PRTYPE | APU PURCHTYPE DETERMINATION - NA | ... |
| PRCHTYPE_CART_NA | IBM | DET_PRTYPE | BOND PURCHTYPE DETERMINATION - NA | ... |
| PRCHTYPE_CART_CA | IBM | DET_PRTYPE | BOND PURCHTYPE DETERMINATION - CA | ... |
| PRCHTYPE_CART_INPRCA | IBM | DET_PRTYPE | BOND PURCHTYPE DETERMINATION – INPR CA | ... |
| PRCHTYPE_CART_INPRUS | IBM | DET_PRTYPE | BOND PURCHTYPE DETERMINATION – INPR US | ... |

*FIG. 3*

| BUSINESS FUNCTION CODE | CORPORATION ID | ENTITY KEY | PROCEDURE ID | |
|---|---|---|---|---|
| DET_PRTYPE | IBM | PAYREQ~*~* | PRCHTYPE_PR_NA | ... |
| DET_PRTYPE | IBM | CART~IBM~US | PRCHTYPE_CART_NA | ... |
| DET_PRTYPE | IBM | CART~IBM~CA | PRCHTYPE_CART_CA | ... |
| DET_PRTYPE | IBM | CART~LNVO~US | PRCHTYPE_CART_NA | ... |
| DET_PRTYPE | IBM | CART~INPR~CA | PRCHTYPE_CART_INPRCA | ... |
| DET_PRTYPE | IBM | CART~INPR~US | PRCHTYPE_CART_INPRUS | ... |

| PROCEDURE ID | CORPORATION ID | PROCEDURE STEP ID | ... |
|---|---|---|---|
| PRCHTYPE_PR_NA | IBM | BLD | ... |
| PRCHTYPE_PR_NA | IBM | REDC | ... |
| PRCHTYPE_PR_NA | IBM | WC | ... |
| PRCHTYPE_PR_NA | IBM | ORDR | ... |
| PRCHTYPE_CART_NA | IBM | BLD | ... |
| PRCHTYPE_CART_NA | IBM | REDC | ... |
| PRCHTYPE_CART_NA | IBM | CAP | ... |
| PRCHTYPE_CART_NA | IBM | ORDR | ... |
| PRCHTYPE_CART_CA | IBM | BLD | ... |
| PRCHTYPE_CART_CA | IBM | REDC | ... |
| PRCHTYPE_CART_CA | IBM | CAP | ... |
| PRCHTYPE_CART_CA | IBM | ORDR | ... |
| PRCHTYPE_CART_INPRCA | IBM | BLD | ... |
| PRCHTYPE_CART_INPRCA | IBM | REDC | ... |
| PRCHTYPE_CART_INPRCA | IBM | CAP | ... |
| PRCHTYPE_CART_INPRCA | IBM | ORDR | ... |
| PRCHTYPE_CART_INPRUS | IBM | BLD | ... |
| PRCHTYPE_CART_INPRUS | IBM | REDC | ... |
| PRCHTYPE_CART_INPRUS | IBM | CAP | ... |
| PRCHTYPE_CART_INPRUS | IBM | ORDR | ... |

| PROCEDURE ID | CORPORATION ID | PREDECESSOR PROCEDURE STEP ID | SUCCESSOR PROCEDURE STEP ID | ... |
|---|---|---|---|---|
| PRCHTYPE_PR_NA | IBM | BLD | REDC | ... |
| PRCHTYPE_PR_NA | IBM | REDC | WC | ... |
| PRCHTYPE_PR_NA | IBM | WC | ORDR | ... |
| PRCHTYPE_CART_NA | IBM | BLD | REDC | ... |
| PRCHTYPE_CART_NA | IBM | REDC | CAP | ... |
| PRCHTYPE_CART_NA | IBM | CAP | ORDR | ... |
| PRCHTYPE_CART_CA | IBM | BLD | REDC | ... |
| PRCHTYPE_CART_CA | IBM | REDC | CAP | ... |
| PRCHTYPE_CART_CA | IBM | CAP | ORDR | ... |
| PRCHTYPE_CART_INPRCA | IBM | BLD | REDC | ... |
| PRCHTYPE_CART_INPRCA | IBM | REDC | CAP | ... |
| PRCHTYPE_CART_INPRCA | IBM | CAP | ORDR | ... |
| PRCHTYPE_CART_INPRUS | IBM | BLD | REDC | ... |
| PRCHTYPE_CART_INPRUS | IBM | REDC | CAP | ... |
| PRCHTYPE_CART_INPRUS | IBM | CAP | ORDR | ... |

*FIG. 6*

| PROCEDURE ID | CORP ID | STEP ID | STEP ACTION CODE | STEP ACTION STATUS | ORDER | FILTER ID | PARAMETERS | |
|---|---|---|---|---|---|---|---|---|
| PRCHTYPE_PR_NA | IBM | BLD | FLTR | FLTR | 1 | CommUsePTFilter | Mode=INCLUDE | ... |
| PRCHTYPE_PR_NA | IBM | BLD | FLTR | FLTR | 2 | CommGLPTFilter | Mode=INCLUDE | ... |
| PRCHTYPE_PR_NA | IBM | REDC | FLTR | FLTR | 1 | DocTypePTFilter | Mode=INCLUDE_ONLY | ... |
| PRCHTYPE_PR_NA | IBM | WC | FLTR | FLTR | 1 | WildCardPTFilter | Mode=INCLUDE_EMPTY | ... |
| PRCHTYPE_PR_NA | IBM | ORDR | FLTR | FLTR | 1 | OrderingPTFilter | Ordering=EXP:LV:HV: WIP:RES:BAL:INV | ... |
| PRCHTYPE_CART_NA | IBM | BLD | FLTR | FLTR | 1 | CommUsePTFilter | Mode=INCLUDE | ... |
| PRCHTYPE_CART_NA | IBM | BLD | FLTR | FLTR | 2 | CommGLPTFilter | Mode=INCLUDE | ... |
| PRCHTYPE_CART_NA | IBM | REDC | FLTR | FLTR | 1 | DocTypePTFilter | Mode=INCLUDE_ONLY | ... |
| PRCHTYPE_CART_NA | IBM | REDC | FLTR | FLTR | 2 | IntResPTFilter | Ilist=RES,Rlist=RES | ... |
| PRCHTYPE_CART_NA | IBM | CAP | FLTR | FLTR | 1 | IBMCapClipPT Filter |  | ... |
| PRCHTYPE_CART_NA | IBM | ORDR | FLTR | FLTR | 1 | OrderingPTFilter | Ordering=EXP:LV:HV: WIP:RES:BAL:INV | ... |
| PRCHTYPE_CART_CA | IBM | BLD | FLTR | FLTR | 1 | CommUsePTFilter | Mode=INCLUDE | ... |
| PRCHTYPE_CART_CA | IBM | BLD | FLTR | FLTR | 2 | CommGLPTFilter | Mode=INCLUDE | ... |
| PRCHTYPE_CART_CA | IBM | REDC | FLTR | FLTR | 1 | DocTypePTFilter | Mode=INCLUDE_ONLY | ... |
| PRCHTYPE_CART_CA | IBM | REDC | FLTR | FLTR | 2 | IntResPTFilter | Ilist=RES:INV, Rlist=RES:INV | ... |
| PRCHTYPE_CART_CA | IBM | CAP | FLTR | FLTR | 1 | IBMCapClipPT Filter |  | ... |
| PRCHTYPE_CART_CA | IBM | ORDR | FLTR | FLTR | 1 | OrderingPTFilter | Ordering=EXP:LV:HV: WIP:RES:BAL:INV | ... |

*FIG. 7A*

| PROCEDURE ID | CORP ID | STEP ID | STEP ACTION CODE | STEP ACTION STATUS | ORDER | FILTER ID | PARAMETERS | |
|---|---|---|---|---|---|---|---|---|
| PRCHTYPE_CART_INPRUS | IBM | BLD | FLTR | FLTR | 1 | CommUsePTFilter | Mode=INCLUDE | ... |
| PRCHTYPE_CART_INPRUS | IBM | BLD | FLTR | FLTR | 2 | CommGLPTFilter | Mode=INCLUDE | ... |
| PRCHTYPE_CART_INPRUS | IBM | REDC | FLTR | FLTR | 1 | DocTypePTFilter | Mode=INCLUDE_ONLY | ... |
| PRCHTYPE_CART_INPRUS | IBM | REDC | FLTR | FLTR | 2 | IntResPTFilter | Ilist=RES,Rlist=RES | ... |
| PRCHTYPE_CART_INPRUS | IBM | CAP | FLTR | FLTR | 1 | INPRCapPTFilter | | ... |
| PRCHTYPE_CART_INPRUS | IBM | ORDR | FLTR | FLTR | 1 | OrderingPTFilter | Ordering=EXP:LV:HV: WIP:RES:BAL:INV | ... |
| PRCHTYPE_CART_INPRCA | IBM | BLD | FLTR | FLTR | 1 | CommUsePTFilter | Mode=INCLUDE | ... |
| PRCHTYPE_CART_INPRCA | IBM | BLD | FLTR | FLTR | 2 | CommGLPTFilter | Mode=INCLUDE | ... |
| PRCHTYPE_CART_INPRCA | IBM | REDC | FLTR | FLTR | 1 | DocTypePTFilter | Mode=INCLUDE_ONLY | ... |
| PRCHTYPE_CART_INPRCA | IBM | REDC | FLTR | FLTR | 2 | IntResPTFilter | Ilist=RES:INV, Rlist=RES:INV | ... |
| PRCHTYPE_CART_INPRCA | IBM | CAP | FLTR | FLTR | 1 | INPRCapPTFilter | | ... |
| PRCHTYPE_CART_INPRCA | IBM | ORDR | FLTR | FLTR | 1 | OrderingPTFilter | Ordering=EXP:LV:HV: WIP:RES:BAL:INV | ... |

*FIG. 7B*

FIG. 8 ically maintained coding. Furthermore, known systems that

SATISFYING RULES THROUGH A CONFIGURATION OF LIST PROCESSING METHODS

FIELD OF THE INVENTION

The present invention relates to a data processing technique for satisfying rules through a configuration of list processing methods, and more particularly to a technique for satisfying heterogeneous sets of complex business rules applied to a commodity through a configuration of methods for building and filtering lists of purchase types.

BACKGROUND OF THE INVENTION

In conventional systems, the management of heterogeneous sets of business rules associated with different entities is handled by expensive, time-consuming, inflexible and difficult-to-maintain coding. Furthermore, known systems that manage the addition of new business rules applied to a commodity to determine appropriate purchase types also employ coding having the aforementioned drawbacks. Thus, there exists a need to overcome at least one of the preceding deficiencies and limitations of the related art.

SUMMARY OF THE INVENTION

The present invention provides a computer-implemented method of satisfying rules through a configuration of list processing methods. A first computing system receives a document from a calling software application executing on a second computing system. The document includes one or more items being processed by a callee software application executing on the first computing system. After receiving the document, the first computing system identifies a procedure for satisfying a plurality of rules. Identifying the procedure includes matching, via a first database table, a unique combination of values to the procedure. The unique combination of values includes one or more attributes of the calling software application and one or more attributes of the document. After identifying the procedure, the first computing system determines steps included in the procedure. Determining the steps includes matching, via a second database table, an identifier of the procedure to the steps. After determining the steps, the first computing system determines a first order in which the steps are to be executed. Determining the first order includes identifying predecessor and successor steps included in the steps. A third database table associates the predecessor and successor steps with the identifier of the procedure. The third database table also associates the predecessor steps and the successor steps in a one-to-one correspondence. After determining the steps, the first computing system determines sets of one or more list processing methods. Determining the sets of one or more list processing methods includes matching, via a fourth database table, a step of the previously determined steps to a set of list processing methods. After determining the sets of one or more list processing methods, the first computing system determines a second order in which the list processing methods in the set of list processing methods are to be executed. The fourth database table associates the second order with the previously determined step. After determining the first order, the first computing system executes the steps in the first order. After executing the steps, the first computing system displays a final selection list of elements on a display device. The displaying of the final selection list facilitates a selection of an element included in the final selection list to characterize an item of the one or more items included in the document.

DETAILED DESCRIPTION OF THE INVENTION

Overview

A software-based calling application (i.e., sending application) executing on a first computer sends parameters of an item (e.g., a commodity code for an item being purchased) to a software-based callee application (i.e., receiving application) executing on a second computer. The callee application provides functionality (e.g., an accounting function) to process the item and the item's parameters. The invention disclosed herein is a technique for satisfying rules through a configuration of list processing (e.g., filtering) methods. The rules are configured in a set of tables designed to store and order the execution of list processing methods in specified sequences. The tables associate each sequence of list processing methods with corresponding attributes of the calling application. Furthermore, the configuration of tables allows the callee application to add new rules and/or to manage different entities' rules without requiring a time-consuming and expensive update of programming code.

In one embodiment, the present invention provides a system and method for (1) receiving a commodity code included in a document (e.g., purchasing document), where the commodity code identifies a commodity being purchased, (2) stepping through a series of business rules via an execution of a sequence of filtering methods, and (3) generating a list of purchase types for that commodity. The business rules are based on:

- Whether or not the commodity is flagged as being eligible as a capital purchase
- Whether the purchase of the commodity is for internal or resale use
- Which purchase types are associated with general ledger account codes for the specified commodity
- Which purchase types are supported by the type of the purchasing document Which commodities are eligible for any purchase type As used herein, a document is defined as a collection of related data elements produced by a computer application (e.g., calling application 108). In one embodiment, one calling application generates related data elements of a first purchasing document in the form of a payment request and another calling application generates related data elements of a second purchasing document in the form of a requisition from an online shopping cart. As one example, a document is a set of related data elements stored in multiple related database tables (e.g., DB2® tables).

System for Satisfying Rules Through a Configuration of List Processing Methods

Figure 1:
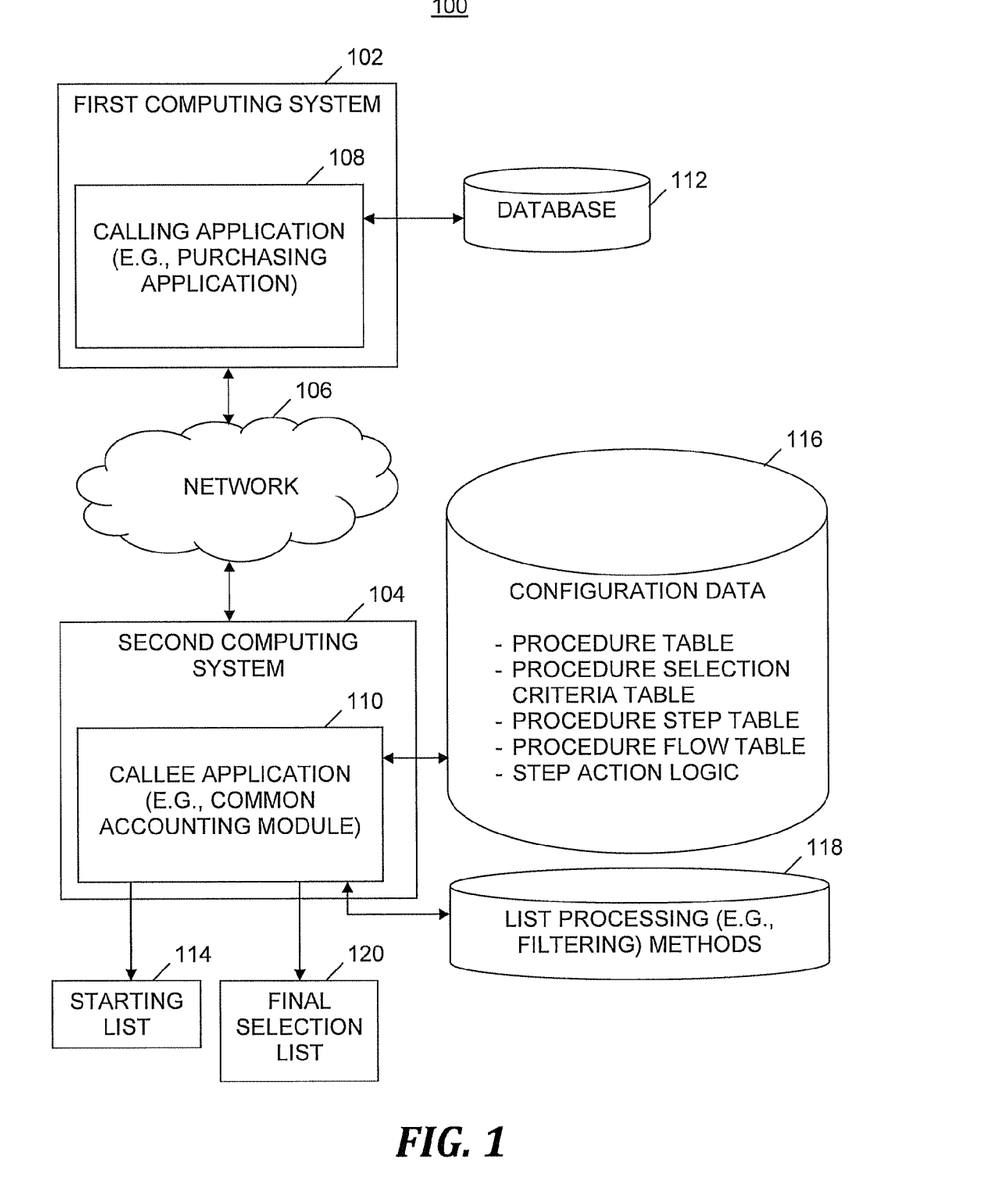
FIG. 1 is a block diagram of a system for satisfying rules through a configuration of list processing methods, in accordance with embodiments of the present invention.

FIG. 1 is a block diagram of a system for satisfying rules through a configuration of list processing methods, in accordance with embodiments of the present invention. System 100 may include a first computing system 102 and a second computing system 104 that share data via a network 106 (e.g., the Internet). First computing system 102 executes a calling application 108. Second computing system 104 executes a callee application 110. Calling application 108 requests a processing of data that requires a function of the callee application. For example, the calling application is a purchasing (i.e., procurement) application and the callee application is an accounting application. In this example, the purchasing application requests that the accounting application process an item being purchased by using a parameter (e.g., commodity code) of the item that is included in a document. The processing of the item derives a list of user-selectable elements (e.g., purchase types) that are appropriate for the item based on rules, attributes of the document, and attributes of the calling application.

A database 112 may be stored in a data storage unit coupled to first computing system 102 and may be accessible by calling application 108. Database 112 includes a set of data elements that are to be processed by callee application 110. For example, the data elements in database 112 may include parameters associated with an item that is being purchased and for which a user is required to select a purchase type (a.k.a. purchasing type). The selection of the purchase type for the item facilitates an accounting function that the callee application 110 is to apply to the item. In one example, the aforementioned parameters include a commodity code that identifies the item being purchased. Other parameters may include identifiers of a company that is purchasing the item and the country in which the company is located.

A starting list 114 is generated by callee application 110. Starting list 114 is a working list of values that is processed by callee application 110. The processing by callee application 110 includes utilizing configuration data 116 to identify a sequence of list processing methods 118. Configuration data 116 is stored in database tables (e.g., relational database tables) that reside on one or more computer data storage units that may be coupled to second computing system 104 or to another computing system. In one embodiment, the database tables include, but are not limited to, a procedure table, a procedure selection criteria table, a procedure step table, a procedure flow table and a step action logic table (see, e.g., FIGS. 3-6 and FIGS. 7A-7B).

The processing by callee application 110 also includes executing the identified sequence of list processing methods 118 to transform starting list 114 into a final selection list 120. In one embodiment, final selection list 120 is displayed on a display device (not shown) coupled to second computing system 104. In another embodiment, final selection list 120 is displayed on a display device (not shown) coupled to a computing system other than second computing system 104.

For example, starting list 114 is an initial list of purchase types for an item and the processing performed by callee application 110 generates a final selection list 120 of purchase types by multiple refinements of starting list 114 through executions of list processing methods that may (1) add one or more values to starting list 114 (or to a refinement of the starting list) and/or (2) filter out one or more other values from starting list 114 (or from a refinement of the starting list). The final selection list 120 includes only the purchase types that are appropriate according to a set of one or more rules retrieved from a rule table (not shown), attributes of a document that included the item, and attributes of the calling application 108.

As used herein, a rule (e.g., business rule) is defined as a requirement of a business entity.

In one embodiment, system 100 is implemented by an integrated web application environment in which data is shared between calling application 108 and callee application 110 via a web service.

In one embodiment, a plurality of calling applications (not shown) being executed on a plurality of computing systems (not shown) send data processing requests to callee application 110 via network 106.

Further details about the functionality of the components of system 100 are included in the discussion below relative to FIG. 2.

Process for Satisfying Rules Trough a Configuration of List Processing Methods

Figure 2:
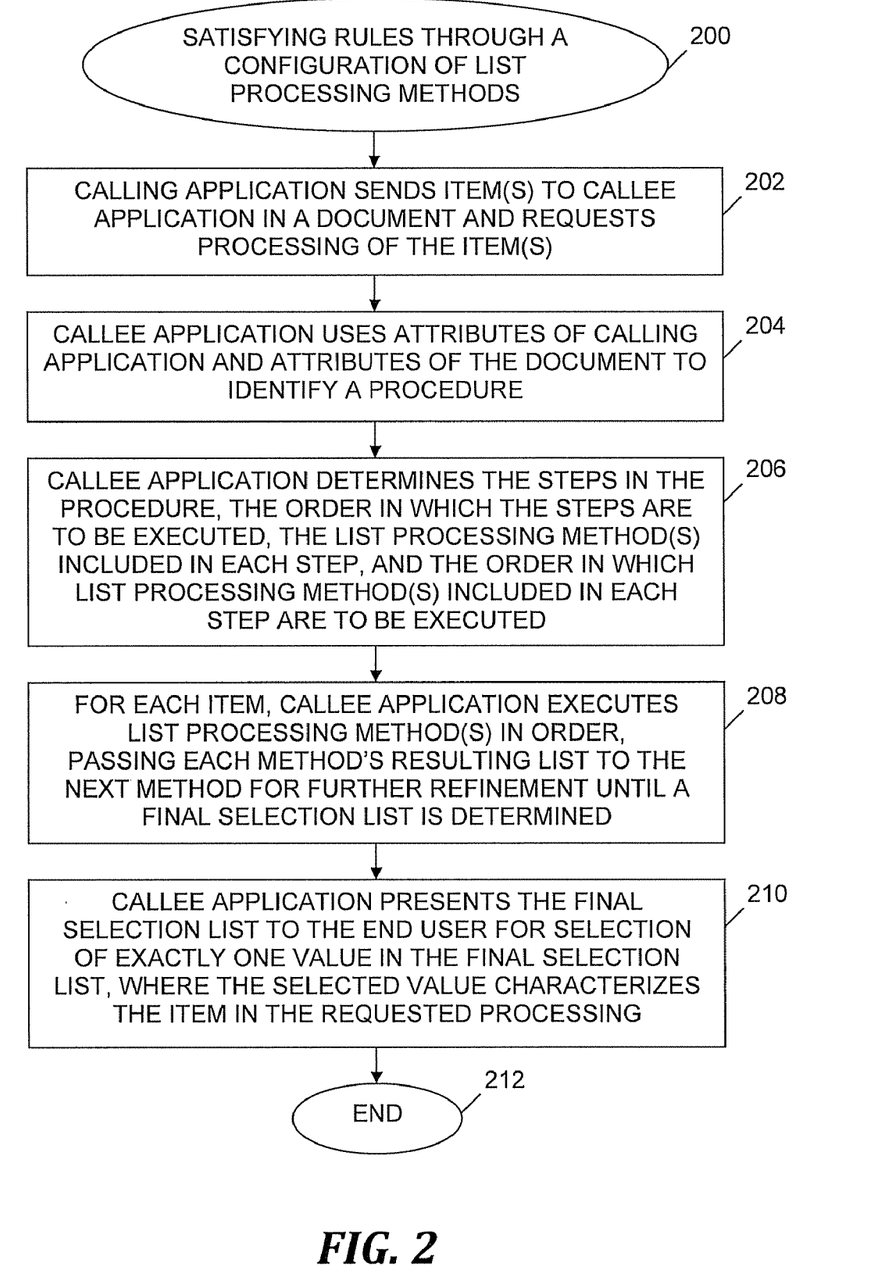
FIG. 2 is a flowchart of a process for satisfying rules through a configuration of list processing methods that is implemented by the system of FIG. 1, in accordance with embodiments of the present invention.

FIG. 2 is a flowchart of a process for satisfying rules through a configuration of list processing methods that is implemented by the system of FIG. 1, in accordance with embodiments of the present invention. The process of FIG. 2 starts at step 200. In step 202, calling application 108 (see FIG. 1) sends to callee application 110 (see FIG. 1) a document that includes one or more items and one or more parameters (a.k.a. item parameters) of each item. The items and parameters are sent in step 202 to be processed by callee application 110 (see FIG. 1) according to the calling application's request for processing. The callee application 110 (see FIG. 1) receives the items and parameters sent in step 202, along with attributes of the calling application 108 (see FIG. 1) and attributes of the document sent in step 202.

In one embodiment, before sending the items and item parameters in step 202, the calling application 108 (see FIG. 1) retrieves the items and item parameters from data records in database 112 (see FIG. 1).

In one embodiment, calling application 108 (see FIG. 1) requests that callee application 110 (see FIG. 1) perform an accounting function with one of the items and associated item parameter(s) sent in step 202. For example, during a procurement process, calling application 108 (see FIG. 1) sends a record of an item that is being purchased by an entity (e.g., a business entity that controls calling application 108 (see FIG. 1)). In the example of this paragraph, the record being sent includes a commodity code that identifies the item being purchased.

In step 204, callee application 110 (see FIG. 1) uses one or more attributes of the calling application 108 (see FIG. 1) and one or more attributes of the document to identify a procedure. An example of an attribute of the document is an indication of whether the document is (1) a requisition generated by an online shopping cart or (2) a payment request generated by an accounts payable utility. Examples of attributes of the calling application 108 (see FIG. 1) include the corporation that is purchasing the item and the country in which the corporation is located. As used herein, a procedure is defined as an ordered collection of actions.

In step 206, callee application 110 (see FIG. 1) utilizes configuration data 116 (see FIG. 1) to determine (1) the steps in the procedure identified in step 204, (2) the order in which the steps are to be executed, (3) the one or more list processing methods (i.e., one or more list processing algorithms) included in each of the identified steps and (4) the order in which list processing method(s) included in each step are to be executed.

In step 208, for each item in the document sent in step 202, callee application 110 (see FIG. 1) executes list processing method(s) in the order determined in step 206. The execution of the first list processing method in the order determined in step 206 refines starting list 114 (see FIG. 1) to generate a refined list of elements (e.g., by filtering out one or more elements of the starting list or by augmenting the starting list with one or more additional elements). If N list processing methods are executed in step 208, then for each of the first N−1 executions, callee application 110 (see FIG. 1) passes a refined list of elements resulting from the execution to the next list processing method (i.e., the list processing method that is next in the order determined in step 206). The next list processing method may then further refine the list of elements (e.g., by augmenting or filtering out one or more elements of the list of elements). The final selection list 120 (see FIG. 1) is a result of executing the N-th list processing method to refine the list of elements that resulted from the execution of the (N−1)-th list processing method.

In one embodiment, the callee application 110 (see FIG. 1) retrieves each list processing method 118 (see FIG. 1) from a computer data storage unit prior to the execution of that method in step 208.

In step 210, callee application 110 (see FIG. 1) presents the final selection list 120 (see FIG. 1) to an end user (e.g., an end user of the callee application) for a selection of exactly one element in the final selection list. After the presentation of the final selection list in step 210, the end user selects exactly one element included in the final selection list. Selecting the one element results in the callee application 110 (see FIG. 1) characterizing the item sent in step 202 according to the selected element.

Following the end user's selection of an element from the final selection list, the callee application 110 (see FIG. 1) stores the selected element in a data repository (e.g., a database table) that resides on a computer data storage unit (e.g., coupled to second computing system 104 of FIG. 1). Following step 210, the process for satisfying rules through a configuration of list processing methods ends at step 212.

In one embodiment, callee application 110 (see FIG. 1) displays in step 210 the final selection list 120 (see FIG. 1) on a display device (e.g., display monitor) coupled to second computing system 104. In step 210, callee application 110 (see FIG. 1) may display the final selection list 120 (see FIG. 1) to an end user in a drop down list, a list box or another Graphical User Interface (GUI) element that includes selectable elements of a list.

In another embodiment, the display device coupled to second computing system 104 displays final selection list 120 (see FIG. 1) along with an indication of a default value for the end user's selection. The end user's selection of one of the values in the final selection list 120 (see FIG. 1) may include choosing to retain the default value or changing the default value to another one of the values in final selection list 120 (see FIG. 1).

In still another embodiment, step 214 includes displaying final selection list 120 (see FIG. 1) on a display device coupled to a computing system other than second computing system 104 (see FIG. 1).

For example, the final selection list 120 (see FIG. 1) is a list of valid purchase types for a purchase of a commodity that is characterized as a capital purchase. In the example of this paragraph, step 210 includes displaying the list of valid purchase types as a drop down list on a display monitor viewed by an end user of a common accounting module, which is an example of the callee application 110 (see FIG. 1). The end user selects a valid purchase type (e.g., direct capital) from the drop down list to characterize the accounting of the commodity that is being purchased. The common accounting module then uses the selected valid purchase type to perform an accounting function to process the commodity.

Sample Tables

Figure 3:
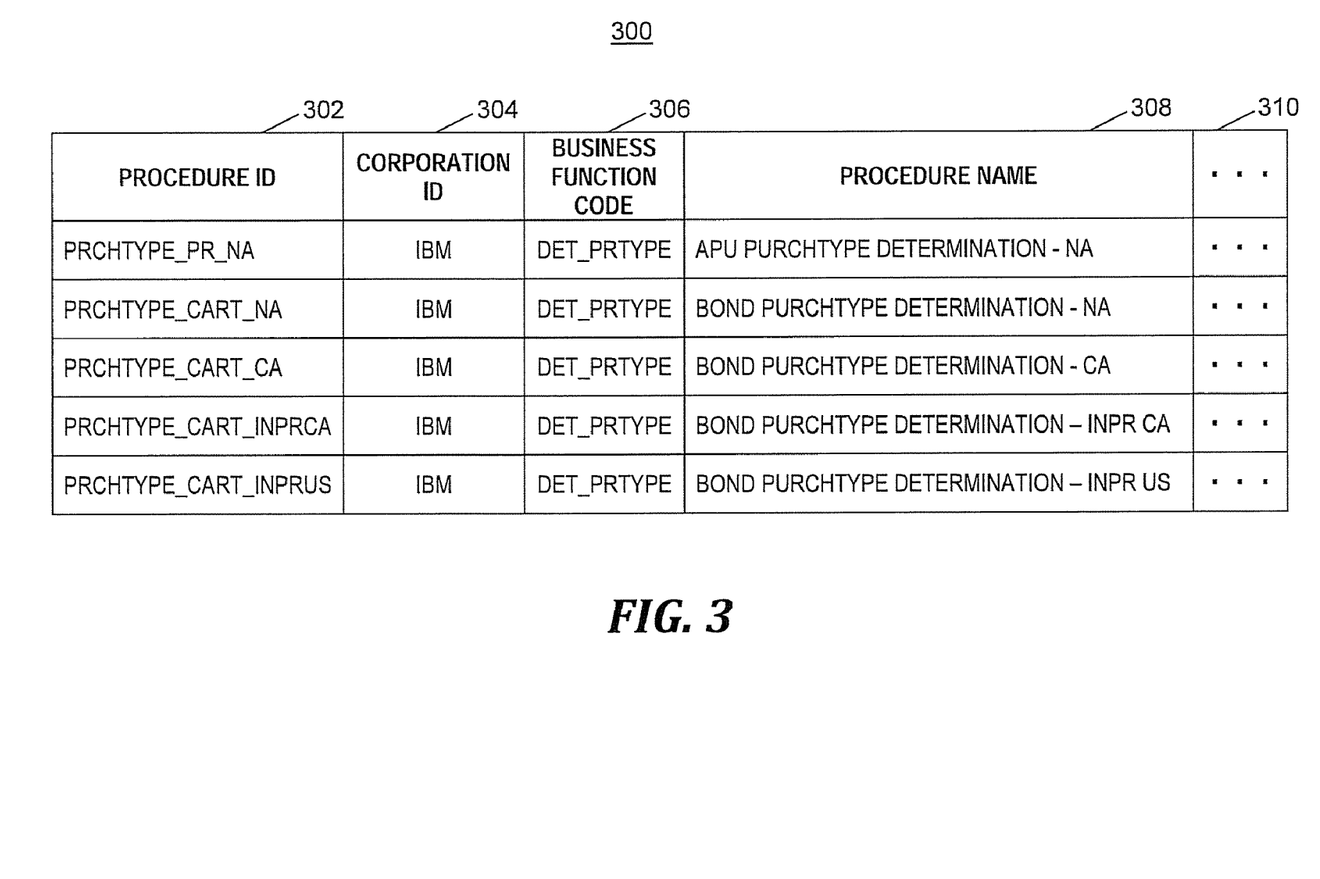
FIG. 3 is an exemplary procedure table utilized in the process of FIG. 2, in accordance with embodiments of the present invention.

FIG. 3 is an exemplary procedure table 300 utilized in the process of FIG. 2, in accordance with embodiments of the present invention. Procedure table 300 allows the system disclosed herein to define multiple combinations of complex business rules. Table 300 includes a procedure identifier (ID) column 302, a corporation ID column 304, a business function code column 306 and a procedure name column 308. Table 300 may also include one or more additional columns 310, such as columns that track changes to data in table 300.

The sample procedures identified in column 302 and named in column 308 include procedures for determining lists of purchase types for a commodity code sent in a document by calling application 108 (see FIG. 1), which is either an accounts payable utility (APU) or a buy on demand (Bond) system. The procedure identifiers in column 302 include indicators of attributes of the calling application and the document, which are used in step 204 of FIG. 2 to identify a particular procedure included in table 300.

The two-letter indicators appearing at the end of the entries in column 302 indicate a geographic location (e.g., country) of the user of calling application 108 (see FIG. 1). For example, the "CA" indicator that appears at the end of entries in columns 302 and 308 in the third data row of table 300 indicates that the user of the calling application is located in Canada.

The indicators appearing after PRCHTYPE_in the entries in column 302 indicate a type of a document that is sent in step 202 (see FIG. 2). For example, "PR" indicates that the document is a payment request from the APU and "CART" indicates that the document is a requisition from an online shopping cart provided by the Bond system. The type of the document is used in step 204 of FIG. 2 to identify a specific procedure in table 300.

Figure 4:
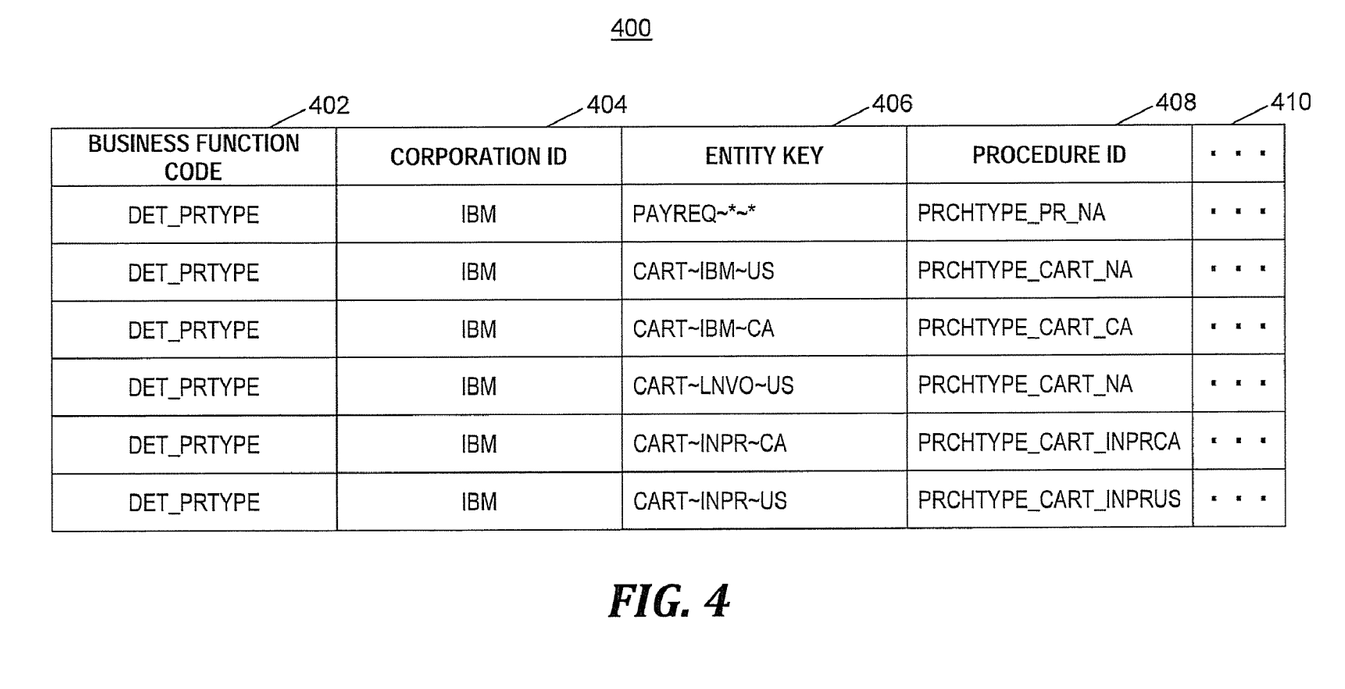
FIG. 4 is an exemplary procedure selection criteria table utilized in the process of FIG. 2, in accordance with embodiments of the present invention.

FIG. 4 is an exemplary procedure selection criteria table 400 utilized in the process of FIG. 2, in accordance with embodiments of the present invention. Table 400 includes a business function code column 402, a corporation ID column 404, an entity key column 406 and a procedure ID column 408. Additional columns 410 (e.g., for tracking changes to data in table 400) may be included in table 400.

Table 400 allows system 100 (see FIG. 1) to establish an association between a document sent in step 202 of FIG. 2 and a set of business rules specified by a procedure in table 300 (see FIG. 3). Each entity key entry in column 406 is a unique combination of the following attributes: document type, corporation and country values. Document type is the type of the document sent in step 202 (see FIG. 1), corporation is the entity that is making the purchase, and country is the geographic location of the user of calling application 108 (see FIG. 1). Each entry in column 406 is in the format of document type-corporation-country.

Step 204 of FIG. 2 uses the attributes in an entity key in column 406 to identify the corresponding procedure ID in column 408. That is, each data row of table 400 associates a unique combination of document type, corporation and country in column 406 (i.e., an entity key) with a corresponding procedure ID in column 408. This association between entity key and procedure ID provided by table 400 allows an execution of a set of business rules (i.e., a sequence of list processing methods) that is uniquely associated with an entity key.

For example, a first set of business rules indicated by the procedure PRCHTYPE_CART_NA (see column 408) is executed for a shopping cart (i.e., CART) document from International Business Machines Corporation (IBM) where the user of the calling application is located in the United States (i.e., entity key=CART~IBM~US). Further, a second set of business rules indicated by the procedure PRCHTYPE_PR_NA (see column 408), which is different from PRCHTYPE_CART_NA, is executed for a payment request (i.e., PR or PAYREQ) document from IBM, where the calling application is located in the United States (i.e., entity key=PAYREQ~*~*, where the "*" is a wildcard character). Still further, a third set of business rules indicated by the procedure PRCHTYPE_CART_CA (see column 408), which is different from PRCHTYPE_PR_NA and PRCHTYPE_CART_NA, is executed for a shopping cart document from IBM, where the user of the calling application is located in Canada (i.e., entity key=CART~IBM~CA).

Figure 5:
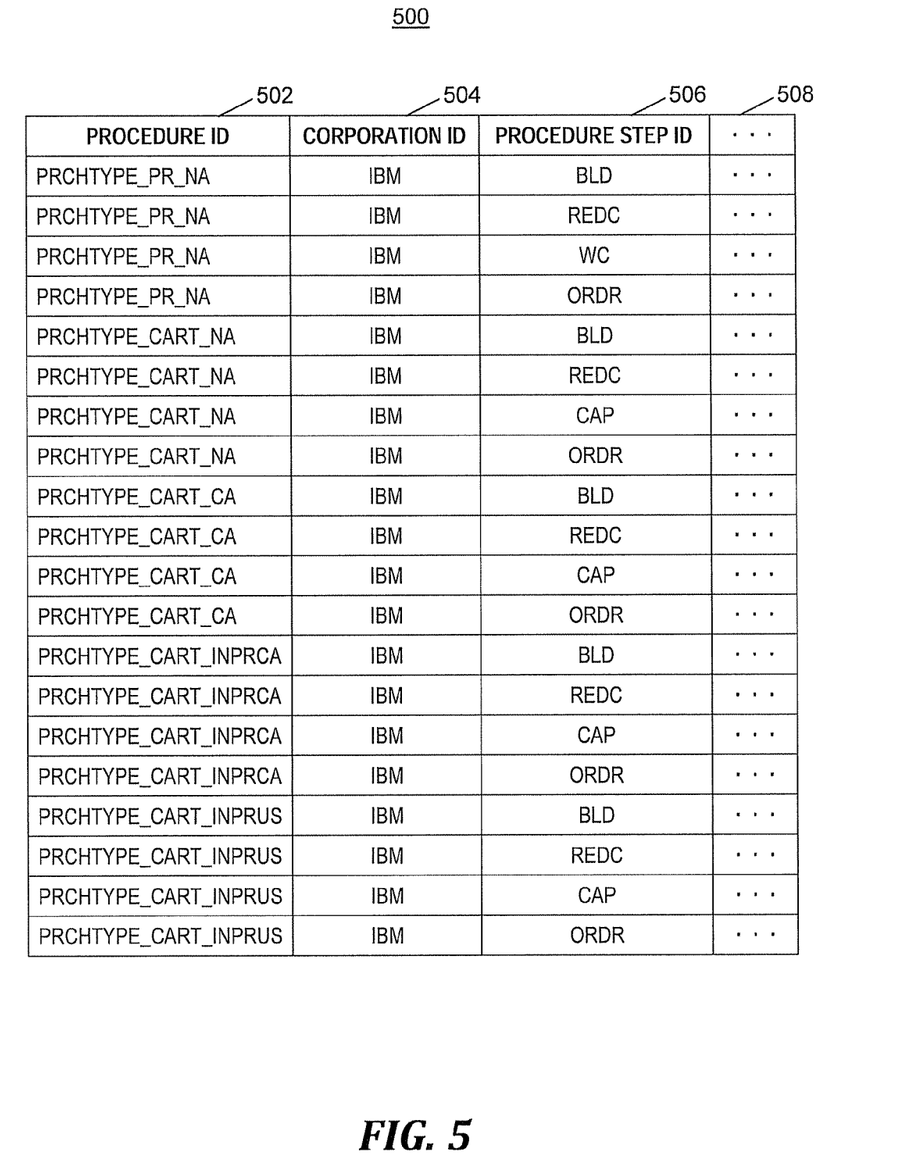
FIG. 5 is an exemplary procedure step table utilized in the process of FIG. 2, in accordance with embodiments of the present invention.

FIG. 5 is an exemplary procedure step table 500 utilized in the process of FIG. 2, in accordance with embodiments of the present invention. Table 500 includes a procedure ID column 502, a corporation ID column 504, a procedure step ID column 506 and may include one or more other columns 508 (e.g., a descriptive code for a procedure step identified in column 506, an indication of which steps in column 506 start and end the procedure identified in column 502, and values that track updates to the data in table 500).

Table 500 is used in step 206 (see FIG. 2) to determine the one or more steps included in a procedure that was identified in step 204 (see FIG. 2). For example, step 204 (see FIG. 2) identifies a procedure as PRCHTYPE_CART_NA and step 206 (see FIG. 2) identifies the fifth through eighth data rows of table 500 as including a PRCHTYPE_CART_NA entry in column 502. Furthermore, step 206 (see FIG. 2) identifies the entries in column 506 (i.e., BLD, REDC, CAP, and ORDR) that correspond to the identified PRCHTYPE_CART_NA entries. Thus, in the example of this paragraph, BLD, REDC, CAP, and ORDR are determined to be the steps of the procedure PRCHTYPE_CART_NA.

Figure 6:
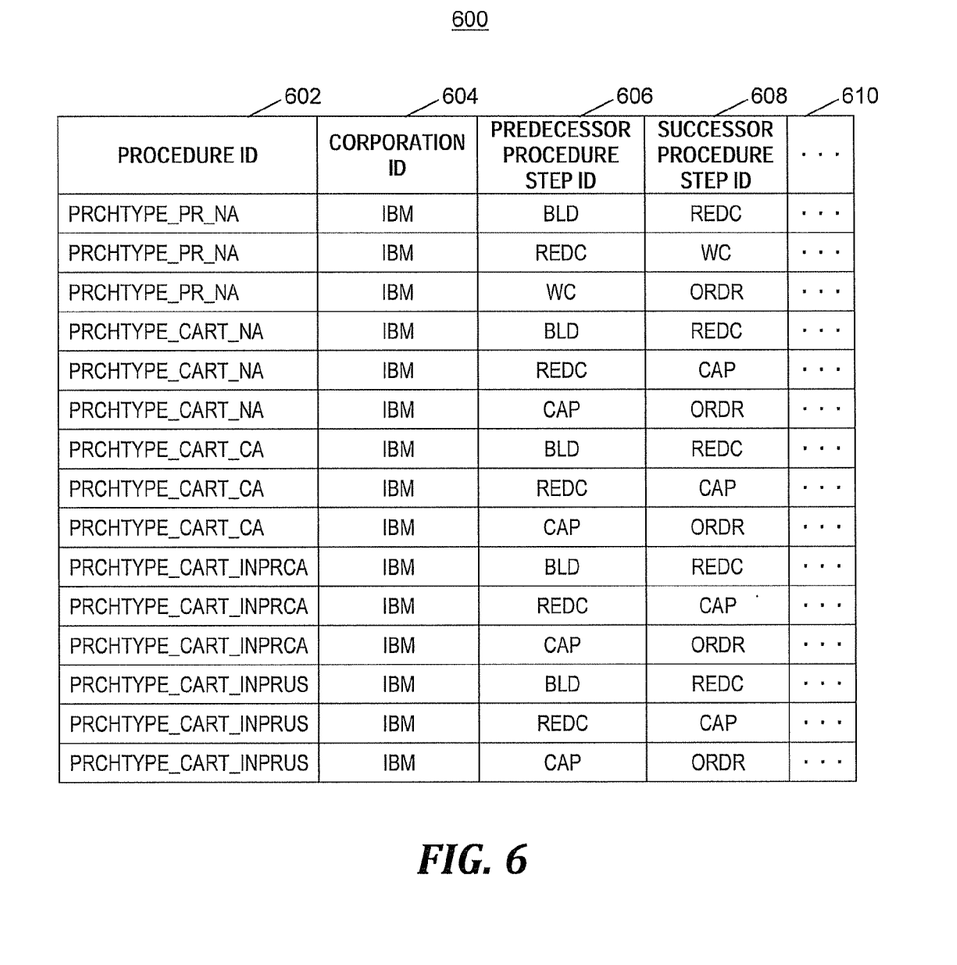
FIG. 6 is an exemplary procedure flow table utilized in the process of FIG. 2, in accordance with embodiments of the present invention.

FIG. 6 is an exemplary procedure flow table 600 utilized in the process of FIG. 2, in accordance with embodiments of the present invention. Table 600 includes a procedure ID column 602, a corporation ID column 604, a predecessor procedure step ID column 606 and a successor procedure step ID column 608. One or more other columns 610 may include information for tracking updates to the data stored in table 600.

Table 600 is used in step 206 (see FIG. 2) to determine the order in which the steps of a procedure are to be executed, where the procedure is identified in step 204 (see FIG. 2). For each row of table 600, the procedure identified in column 602 includes one step identified in column 606 (i.e., a predecessor step) that is immediately followed by another step identified in column 608 (i.e., a successor step). Using the same example described above relative to FIG. 5, the identified steps of BLD, REDC, CAP and ORDR for the procedure PRCHTYPE_CART_NA are to be executed in the order (1) BLD, (2) REDC, (3) CAP, and (4) ORDR based on the predecessor steps and successor steps included in columns 606 and 608, respectively. For instance, the REDC step follows the BLD step in the PRCHTYPE_CART_NA procedure because a row of table 600 that includes PRCHTYPECART_NA in column 602 also includes REDC as the successor procedure step in column 608 and BLD as the predecessor step in column 606.

Figure 7A:
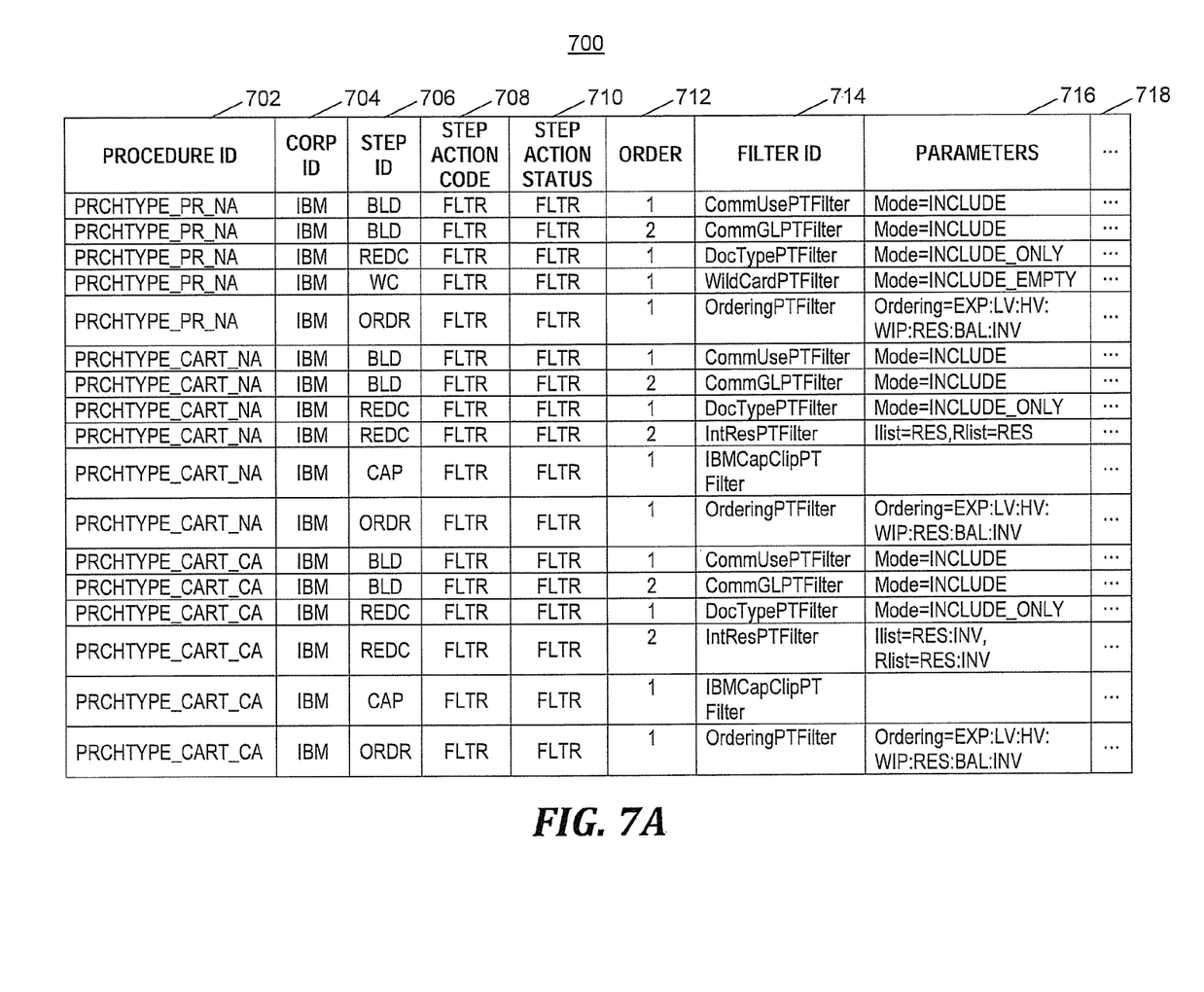
FIGS. 7A-7B depict two portions of an exemplary step action logic table utilized in the process of FIG. 2, in accordance with embodiments of the present invention.
Figure 7B:
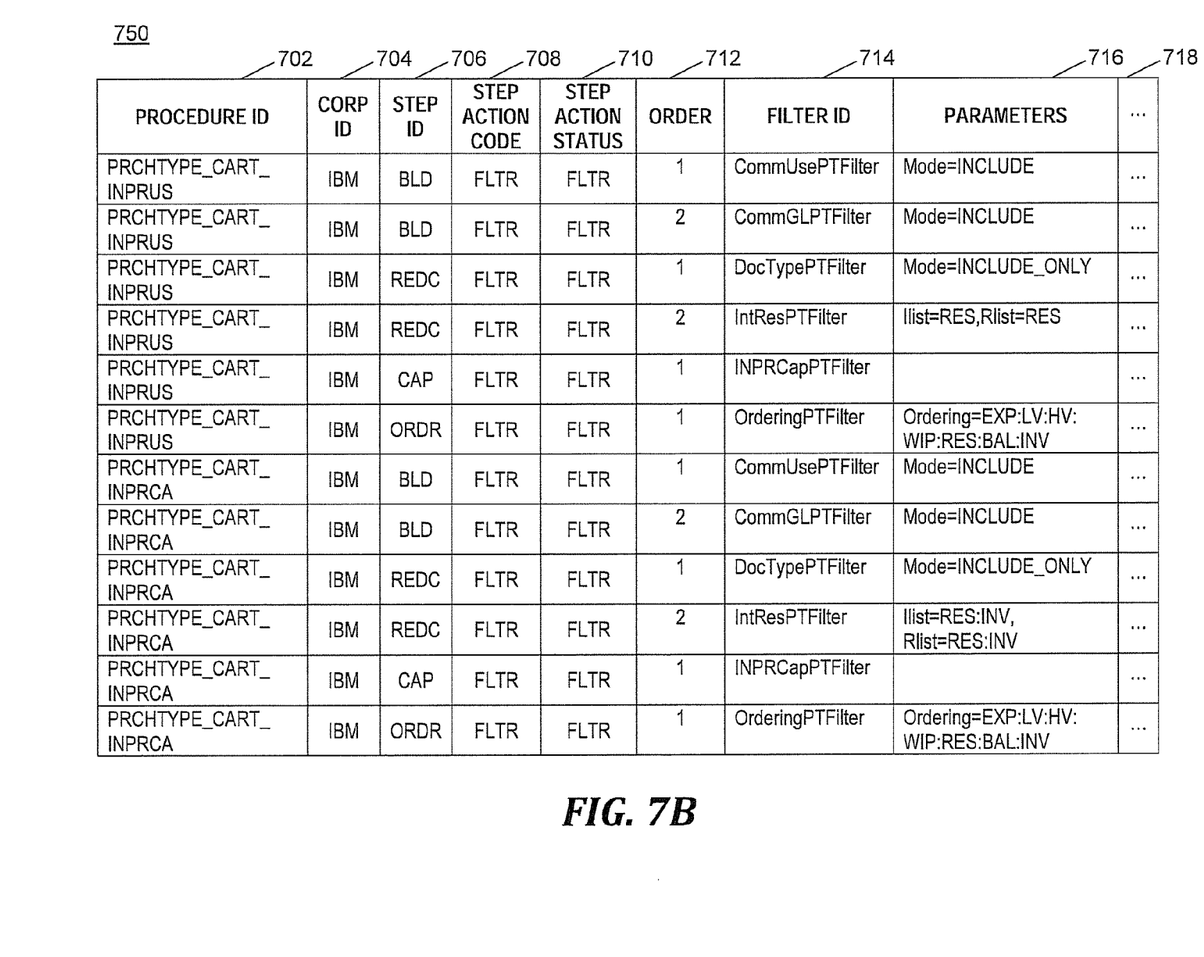

FIGS. 7A-7B depict two portions of an exemplary step action logic table utilized in the process of FIG. 2, in accordance with embodiments of the present invention. A first portion 700 of the step action logic table is shown in FIG. 7A. A second portion 750 of the step action logic table is shown in FIG. 7B. The step action logic table of FIGS. 7A and 7B includes a procedure ID column 702, a corp ID (i.e., corporation ID) column 704, a step ID column 706, a step action code 708, a step action status 710, an order column 712 (i.e., "order by" numbers to place list processing methods of a step in a sequence), a filter ID column 714, and a parameters column 716. Table 700 may include one or more other columns 718 that track updates of the data in table 700. The filter algorithms identified in column 714 are examples of the list processing methods described above relative to FIGS. 1 and 2.

Table 700 is used in step 206 (see FIG. 2) to determine the order in which filter algorithms are to be executed, where the filter algorithms are included in a step of a procedure identified in step 204 (see FIG. 2). The "order by" numbers in column 712 for a particular step in column 706 and a particular procedure in column 702 indicate the order for executing the filter algorithms in step 208 (see FIG. 2).

Continuing the example presented above relative to FIGS. 5 and 6, the first step (i.e., the BLD step) of the PRCHTYPE_CART_NA procedure includes the execution of the following filters (see column 714): CommUsePTFilter and CommGLPTFilter. Since CommUsePTFilter is associated with a 1 in order column 712 and CommGLPTFilter is associated with a 2 in order column 712, step 208 (see FIG. 2) executes the BLD step of the PRCHTYPE_CART_NA procedure by executing CommUsePTFilter prior to executing CommGLPTFilter. Step 208 obtains identifiers and parameters for filters CommUsePTFilter and CommGLPTFilter from column 714 and column 716, respectively.

Each filtering algorithm included in a step of a procedure identified in column 702 is independent of the other filtering algorithms, and therefore the filtering algorithms can be executed in any order. Each filtering algorithm takes as input a list of purchase types, modifies (e.g., adds to or subtracts from) the inputted list of purchase types according the function of the filtering algorithm, and then returns a modified list of purchase types.

Different procedures identified in column 702 may specify (1) different sets of filtering algorithms, (2) different sequences of the same set of filtering algorithms, and (3) different parameters for the same filtering algorithm.

The result of executing the filtering algorithms (see column 714) in the specified order (see column 712) for each step (see column 706) of a procedure (see column 702) is to transform a starting list of purchase types to a final selection list that includes only those purchase types that are allowable for a given commodity. A purchase type is allowable for a given commodity based on one or more business rules.

Sample List Processing Methods

List processing methods executed in step 208 of FIG. 2 may range from simple to complex. As an example of a simple list processing method, the DocTypePTFilter filtering method (i.e., filtering algorithm) identified in table 700 looks up the purchasing document type (i.e., shopping cart or payment request) in a database table, obtains a set of purchase types associated with that purchasing document type, and applies the filter. If the filtering mode specified in the parameters (see column 716) indicates "include," then the list of valid purchase types that was input to the DocTypePTFilter is augmented by the obtained set of purchase types. If the filtering mode indicates "exclude," then the list of purchase types that was input to DocTypePTFilter is pared down, removing any purchase types that exist in the input list and in the filtering set.

As an example of a complex list processing method, the CommGLPTFilter filtering method finds the set of purchase types that have been configured with associated general ledger account codes for a given purchase type. CommGLPTFilter uses the following tables:

A first database table that maps a commodity code to one or more general ledger account codes and associates the general ledger account code(s) to related purchase types.

A second database table (i.e., an exception table) that includes account codes that are restricted for use to only certain charge-to companies.

A third database table that associates multiple charge-to company codes to purchasing company codes in a many-to-one correspondence. The third database table facilitates an end user who does not know a charge-to company code, but does know a purchasing company code. A purchasing company code is on the document sent in step 202 (see FIG. 2).

The CommGLPTFilter filtering method being applied to a user (1) takes the commodity code from the item and the purchasing company code included in the document sent in step 202 (see FIG. 2), (2) uses the third database table described above to find all charge-to company codes associated with the purchasing company code, (3) uses the first database table described above to find all purchase types that have an associated general ledger account code, and (4) uses the second database table described above to eliminate those purchase types that are restricted for use to a charge-to company that does not apply to the user. The resulting set of purchase types is then used to filter the list of purchase types that was input into the CommGLPTFilter filtering method to either exclude or include the resulting set of purchase types, based on the filtering mode specified in the parameters of the CommGLPTFilter filtering method (see column 716).

Computing System

Figure 8:
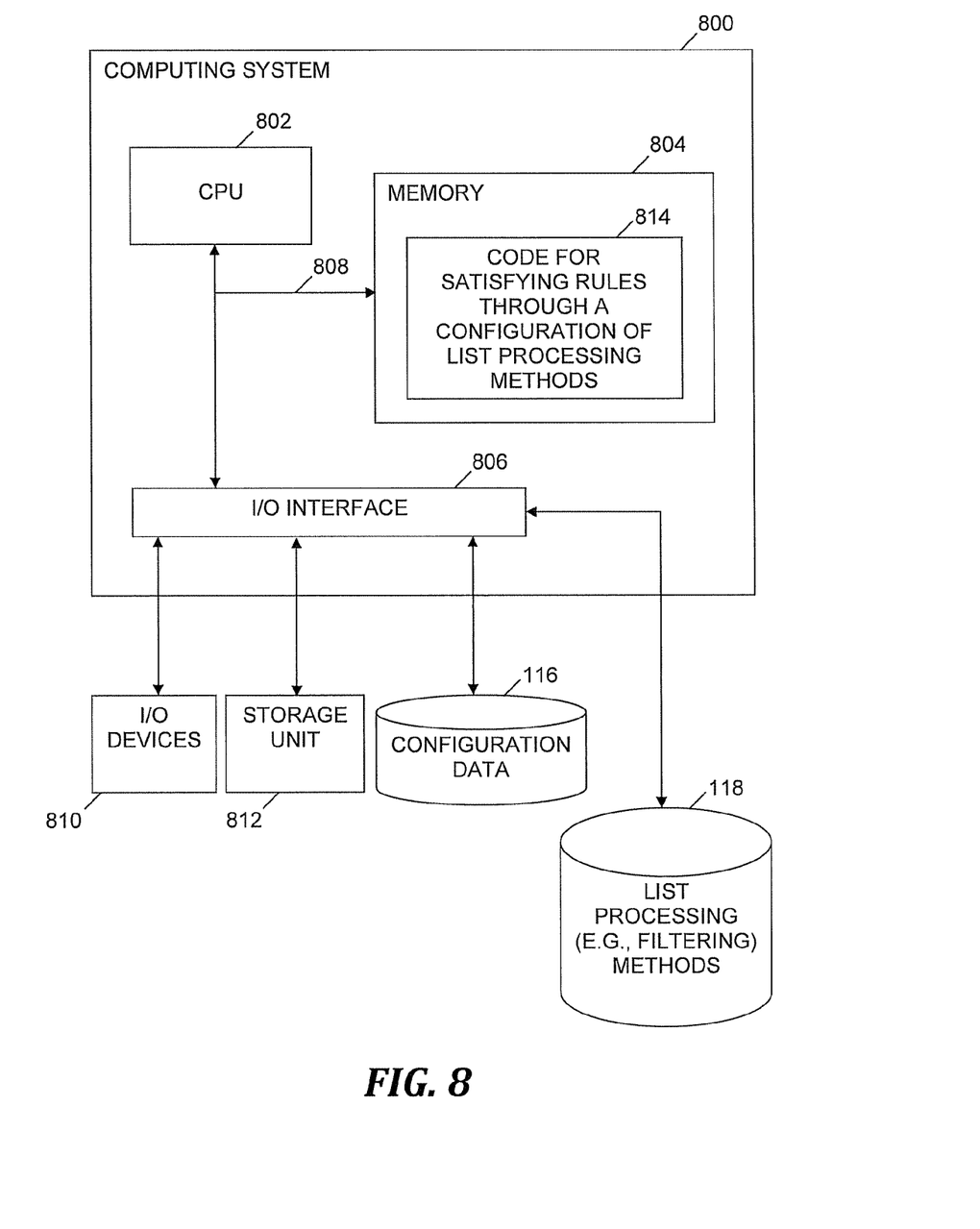
FIG. 8 is a computing system that is included in the system of FIG. 1 and that implements the process of FIG. 2, in accordance with embodiments of the present invention.

FIG. 8 is a computing system that is included in the system of FIG. 1 and that implements the process of FIG. 2, in accordance with embodiments of the present invention. Computing system 800 generally comprises a central processing unit (CPU) 802, a memory 804, an input/output (I/O) interface 806, and a bus 808. Further, computing system 800 is coupled to I/O devices 810 and a computer data storage unit 812. CPU 802 performs computation and control functions of computing system 800. CPU 802 may comprise a single processing unit, or be distributed across one or more processing units in one or more locations (e.g., on a client and server).

Memory 804 may comprise any known type of computer data storage and/or transmission media, including bulk storage, magnetic media, optical media, random access memory (RAM), read-only memory (ROM), a data cache, a data object, etc. In one embodiment, cache memory elements of memory 804 provide temporary storage of at least some program code in order to reduce the number of times code must be retrieved from bulk storage during execution. Moreover, similar to CPU 802, memory 804 may reside at a single physical location, comprising one or more types of data storage, or be distributed across a plurality of physical systems in various forms. Further, memory 804 can include data distributed across, for example, a local area network (LAN) or a wide area network (WAN).

I/O interface 806 comprises any system for exchanging information to or from an external source. I/O devices 810 comprise any known type of external device, including a display device (e.g., monitor), keyboard, mouse, printer, speakers, handheld device, facsimile, etc. In one embodiment, an I/O device 810 such as a display device displays the final selection list 120 (see FIG. 1) in step 210 (see FIG. 2). Bus 808 provides a communication link between each of the components in computing system 800, and may comprise any type of transmission link, including electrical, optical, wireless, etc.

I/O interface 806 also allows computing system 800 to store and retrieve information (e.g., program instructions or data) from an auxiliary storage device such as computer data storage unit 812. The auxiliary storage device may be a non-volatile storage device, such as a hard disk drive or an optical disc drive (e.g., a CD-ROM drive which receives a CD-ROM disk). Computer data storage unit 812 is, for example, a magnetic disk drive (i.e., hard disk drive) or an optical disk drive.

Memory 804 includes computer program code 814 that provides the logic for satisfying rules through a configuration of list processing methods (e.g., the process of FIG. 2). In one embodiment, computer program code 814 provides functionality of callee application 110 (see FIG. 1), which employs configuration data 116 and list processing methods 118 as described above relative to FIGS. 1 and 2. Further, memory 804 may include other systems not shown in FIG. 8, such as an operating system (e.g., Linux) that runs on CPU 802 and provides control of various components within and/or connected to computing system 800.

Configuration data 116 is stored in a database (e.g., a relational database), which may reside in storage unit 812 or in another computer data storage unit (not shown) that is coupled to computing system 800 or to another computing system (not shown). Furthermore, list processing methods 118 may be stored by computing system 800 in computer data storage unit 812 or in another computer data storage unit (not shown), which may be coupled to computing system 800 or to another computing system (not shown).

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "system" (e.g., system 100 or computing system 800). Furthermore, the present invention may take the form of a computer program product embodied in any tangible medium of expression (e.g., memory 804 or computer data storage unit 812) having computer-usable program code (e.g., code 814) embodied in the medium.

Any combination of one or more computer-usable or computer-readable medium(s) (e.g., memory 804 and computer data storage unit 812) may be utilized. The computer-usable or computer-readable medium may be, for example but not limited to, an electronic, magnetic, optical, electromagnetic, infrared or semiconductor system, apparatus, device or propagation medium. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code (e.g., code 814) for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer (e.g., computing system 800), partly on the user's computer, as a stand-alone software package, partly on the user's computer and partly on a remote computer or entirely on the remote computer or server. In the latter scenario, the remote computer may be connected to the user's computer through any type of network (not shown), including a LAN, a WAN, or the connection may be made to an external computer (e.g., through the Internet using an Internet Service Provider).

The present invention is described herein with reference to flowchart illustrations (e.g., FIG. 2) and/or block diagrams of methods, apparatus (systems) (e.g., FIG. 1 and FIG. 8), and computer program products according to embodiments of the invention. It will be understood that each block of the flowchart illustrations and/or block diagrams, and combinations of blocks in the flowchart illustrations and/or block diagrams, can be implemented by computer program instructions (e.g., code 814). These computer program instructions may be provided to a processor (e.g., CPU 802) of a general purpose computer (e.g., computing system 800), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 804 or computer data storage unit 812) that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer (e.g., computing system 800) or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any of the components of the present invention can be deployed, managed, serviced, etc. by a service provider that offers to deploy or integrate computing infrastructure with respect to the configurable rule-based method of transforming a starting list into a selection list. Thus, the present invention discloses a process for supporting computer infrastructure, comprising integrating, hosting, maintaining and deploying computer-readable code (e.g., code 814) into a computing system (e.g., computing system 800), wherein the code in combination with the computing system is capable of performing a method of satisfying rules through a configuration of list processing methods.

In another embodiment, the invention provides a business method that performs the process steps of the invention on a subscription, advertising and/or fee basis. That is, a service provider, such as a Solution Integrator, can offer to create, maintain, support, etc. a method of satisfying rules through a configuration of list processing methods. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart in FIG. 2 and the block diagrams in FIG. 1 and FIG. 8 illustrate the architecture, functionality, and operation of possible implementations of systems, methods, and computer program products according to various embodiments of the present invention. In this regard, each block in the flowchart or block diagrams may represent a module, segment, or portion of code (e.g., code 814), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of satisfying rules through a configuration of list processing methods, comprising:

receiving, by a first computing system and from a calling software application executing on a second computing system, a document that includes one or more items being processed by a callee software application executing on said first computing system;

identifying, by said first computing system and subsequent to said receiving said document, a procedure for satisfying a plurality of rules, wherein said identifying said procedure includes matching, via a first database table, a unique combination of values to said procedure, wherein said unique combination of values includes one or more attributes of said calling software application and one or more attributes of said document;

determining, by said first computing system and subsequent to said identifying said procedure, a plurality of steps included in said procedure, wherein said determining said plurality of steps includes matching, via a second database table, an identifier of said procedure to said plurality of steps;

determining, by said first computing system and subsequent to said determining said plurality of steps, a first order in which said plurality of steps are to be executed, wherein said determining said first order includes identifying a plurality of predecessor steps included in said plurality of steps and a plurality of successor steps included in said plurality of steps, wherein said plurality of predecessor steps and said plurality of successor steps are associated with said identifier of said procedure in a third database table, and wherein said third database table associates said predecessor steps and said successor steps in a one-to-one correspondence;

determining, by said first computing system and subsequent to said determining said plurality of steps, a plurality of sets of one or more list processing methods, wherein said determining said plurality of sets of one or more list processing methods includes matching, via a fourth database table, a step of said plurality of steps to a set of list processing methods of said plurality of sets of one or more list processing methods;

determining, by said first computing system and subsequent to said determining said plurality of sets of one or more list processing methods, a second order in which said list processing methods of said set of list processing methods are to be executed, wherein said second order is associated in said fourth database table with said step of said plurality of steps;

executing, by said first computing system and subsequent to said determining said first order, said plurality of steps in said first order; and displaying, by said first computing system and subsequent to said executing said plurality of steps, a final selection list of elements on a display device, wherein said displaying facilitates a selection of an element included in said final selection list to characterize an item of said one or more items.

2. The method of claim 1, wherein said executing said plurality of steps in said first order includes:

executing said list processing methods included in said set of list processing methods in said second order, and generating said final selection list of elements based on said plurality of rules, wherein said plurality of rules is configured in said first database table, said second database table, said third database table, and said fourth database table.

3. The method of claim 1, wherein said receiving said document includes receiving an identifier code that identifies a commodity being purchased, and wherein said final selection list of elements is a list of purchase types that characterize said commodity according to said plurality of rules.

4. The method of claim 3, further comprising:

satisfying said plurality of rules for said commodity via said executing said plurality of steps, wherein a result of said satisfying said plurality of rules is said list of purchase types, and wherein said plurality of rules is configured by said first database table, said second database table, said third database table, and said fourth database table; and satisfying a second plurality of rules for said commodity, wherein a result of said satisfying said second plurality of rules is a second list of purchase types, wherein said second plurality of rules is configured by said first database table, said second database table, said third database table, and said fourth database table, wherein said second plurality of rules is different from said plurality of rules, wherein said second list of purchase types is different from said list of purchase types, and wherein said callee software application performs said satisfying said second plurality of rules subsequent to said satisfying said plurality of rules without requiring an update of any programming code included in said callee software application.

5. The method of claim 4, wherein said plurality of rules is a first plurality of business rules of a first business entity, wherein said second plurality of rules is a second plurality of business rules of a second business entity, and wherein said first business entity is different from said second business entity.

6. The method of claim 1, wherein said document is a purchasing document selected from the group consisting of a payment request and a requisition from an online shopping cart.

7. The method of claim 1, wherein said calling software application is a purchasing application and said callee software application is an accounting application.

8. A computing system comprising a processor coupled to a computer-readable memory unit, said memory unit comprising a software application, said software application comprising instructions that when executed by said processor implement the method of claim 1.

9. A computer program product, comprising a tangible, computer readable storage device, having a computer readable program code stored therein, said computer-readable program code containing instructions that when executed by a processor of a first computing system implement a method of satisfying rules through a configuration of list processing methods, said method comprising:

receiving, from a calling software application executing on a second computing system, a document that includes one or more items being processed by a calling software application executing on said first computing system;

identifying, subsequent to said receiving said document, a procedure for satisfying a plurality of rules, wherein said identifying said procedure includes matching, via a first database table, a unique combination of values to said procedure, wherein said unique combination of values includes one or more attributes of said calling software application and one or more attributes of said document;

determining, subsequent to said identifying said procedure, a plurality of steps included in said procedure, wherein said determining said plurality of steps includes matching, via a second database table, an identifier of said procedure to said plurality of steps;

determining, subsequent to said determining said plurality of steps, a first order in which said plurality of steps are to be executed, wherein said determining said first order includes identifying a plurality of predecessor steps included in said plurality of steps and a plurality of successor steps included in said plurality of steps, wherein said plurality of predecessor steps and said plurality of successor steps are associated with said identifier of said procedure in a third database table, and wherein said third database table associates said predecessor steps and said successor steps in a one-to-one correspondence;

determining, subsequent to said determining said plurality of steps, a plurality of sets of one or more list processing methods, wherein said determining said plurality of sets of one or more list processing methods includes matching, via a fourth database table, a step of said plurality of steps to a set of list processing methods of said plurality of sets of one or more list processing methods;

determining, subsequent to said determining said plurality of sets of one or more list processing methods, a second order in which said list processing methods of said set of list processing methods are to be executed, wherein said second order is associated in said fourth database table with said step of said plurality of steps;

executing, subsequent to said determining said first order, said plurality of steps in said first order; and displaying, subsequent to said executing said plurality of steps, a final selection list of elements on a display device, wherein said displaying facilitates a selection of an element included in said final selection list to characterize an item of said one or more items.

10. The program product of claim 9, wherein said executing said plurality of steps in said first order includes:

executing said list processing methods included in said set of list processing methods in said second order, and generating said final selection list of elements based on said plurality of rules, wherein said plurality of rules is configured by said first database table, said second database table, said third database table, and said fourth database table.

11. The program product of claim 9, wherein said receiving said document includes receiving an identifier code that identifies a commodity being purchased, and wherein said final selection list of elements is a list of purchase types that characterize said commodity according to said plurality of rules.

12. The program product of claim 11, farther comprising:

satisfying said plurality of rules for said commodity via said executing said plurality of steps, wherein a result of said satisfying said plurality of rules is said list of purchase types, and wherein said plurality of rules is configured by said first database table, said second database table, said third database table, and said fourth database table; and satisfying a second plurality of rules for said commodity, wherein a result of said satisfying said second plurality of rules is a second list of purchase types, wherein said second plurality of rules is configured by said first database table, said second database table, said third database table, and said fourth database table, wherein said second plurality of rules is different from said plurality of rules, wherein said second list of purchase types is different from said list of purchase types, and wherein said callee software application performs said satisfying said second plurality of rules subsequent to said satisfying said plurality of rules without requiring an update of said computer-readable program code.

13. The program product of claim 12, wherein said plurality of rules is a first plurality of business rules of a first business entity, wherein said second plurality of rules is a second plurality of business rules of a second business entity, and wherein said first business entity is different from said second business entity.

14. The program product of claim 9, wherein said document is a purchasing document selected from the group consisting of a payment request and a requisition from an online shopping cart.

15. A process for supporting computing infrastructure, said process comprising providing at least one support service for at least one of creating, integrating, hosting, maintaining, and deploying computer-readable code in a first computing system, wherein the code in combination with the first computing system is capable of performing a method of satisfying rules through a configuration of list processing methods, said method comprising:

receiving, by said first computing system and from a calling software application executing on a second computing system, a document that includes one or more items being processed by a callee software application executing on said first computing system;

identifying, by said first computing system and subsequent to said receiving said document, a procedure for satisfying a plurality of rules, wherein said identifying said procedure includes matching, via a first database table, a unique combination of values to said procedure, wherein said unique combination of values includes one or more attributes of said calling software application and one or more attributes of said document;

determining, by said first computing system and subsequent to said identifying said procedure, a plurality of steps included in said procedure, wherein said determining said plurality of steps includes matching, via a second database table, an identifier of said procedure to said plurality of steps;

determining, by said first computing system and subsequent to said determining said plurality of steps, a first order in which said plurality of steps are to be executed, wherein said determining said first order includes identifying a plurality of predecessor steps included in said plurality of steps and a plurality of successor steps included in said plurality of steps, wherein said plurality of predecessor steps and said plurality of successor steps are associated with said identifier of said procedure in a third database table, and wherein said third database table associates said predecessor steps and said successor steps in a one-to-one correspondence;

determining, by said first computing system and subsequent to said determining said plurality of steps, a plurality of sets of one or more list processing methods, wherein said determining said plurality of sets of one or more list processing methods includes matching, via a fourth database table, a step of said plurality of steps to a set of list processing methods of said plurality of sets of one or more list processing methods;

determining, by said first computing system and subsequent to said determining said plurality of sets of one or more list processing methods, a second order in which said list processing methods of said set of list processing methods are to be executed, wherein said second order is associated in said fourth database table with said step of said plurality of steps;

executing, by said first computing system and subsequent to said determining said first order, said plurality of steps in said first order; and displaying, by said first computing system and subsequent to said executing said plurality of steps, a final selection list of elements on a display device, wherein said displaying facilitates a selection of an element included in said final selection list to characterize an item of said one or more items.

16. The process of claim 15, wherein said executing said plurality of steps in said first order includes:
- executing said list processing methods included in said set of list processing methods in said second order, and
- generating said final selection list of elements based on said plurality of rules, wherein said plurality of rules is configured in said first database table, said second database table, said third database table, and said fourth database table.

17. The process of claim 15, wherein said receiving said document includes receiving an identifier code that identifies a commodity being purchased, and wherein said final selection list of elements is a list of purchase types that characterize said commodity according to said plurality of rules.

18. The process of claim 17, wherein said method further comprises:
- satisfying said plurality of rules for said commodity via said executing said plurality of steps, wherein a result of said satisfying said plurality of rules is said list of purchase types, and wherein said plurality of rules is configured by said first database table, said second database table, said third database table, and said fourth database table; and
- satisfying a second plurality of rules for said commodity, wherein a result of said satisfying said second plurality of rules is a second list of purchase types, wherein said second plurality of rules is configured by said first database table, said second database table, said third database table, and said fourth database table, wherein said second plurality of rules is different from said plurality of rules, wherein said second list of purchase types is different from said list of purchase types, and wherein said callee software application performs said satisfying said second plurality of rules subsequent to said satisfying said plurality of rules without requiring an update of any programming code included in said callee software application.

19. The process of claim 18, wherein said plurality of rules is a first plurality of business rules of a first business entity, wherein said second plurality of rules is a second plurality of business rules of a second business entity, and wherein said first business entity is different from said second business entity.

20. The process of claim 15, wherein said document is a purchasing document selected from the group consisting of a payment request and a requisition from an online shopping cart.

* * * * *